United States Patent
So

(10) Patent No.: US 6,487,991 B2
(45) Date of Patent: Dec. 3, 2002

(54) BIRD LAUNCHER WITH REMOTE CONTROLLED SYSTEM

(76) Inventor: Ho-Yun So, 8-1006, Kwangjang Apt., 28, Youido-dong, Yongdungpo-gu, Seoul 150-010 (KR)

( * ) Notice: Subject to any disclaimer, the term of this patent is extended or adjusted under 35 U.S.C. 154(b) by 0 days.

(21) Appl. No.: 09/947,023

(22) Filed: Sep. 5, 2001

(65) Prior Publication Data

US 2002/0033143 A1 Mar. 21, 2002

(30) Foreign Application Priority Data

Sep. 8, 2000 (KR) ............................................. 00-53471

(51) Int. Cl.[7] .............................. A01K 1/08; A01K 31/00
(52) U.S. Cl. ....................................................... 119/427
(58) Field of Search ................................. 119/424, 427, 119/720

(56) References Cited

U.S. PATENT DOCUMENTS

| | | | | | |
|---|---|---|---|---|---|
| 2,200,504 | A | * | 5/1940 | Keen | 119/424 |
| 3,303,820 | A | * | 2/1967 | Boyles | 119/427 |
| 3,357,405 | A | * | 12/1967 | Stormon et al. | 119/427 |
| 5,983,551 | A | | 11/1999 | Lalor | 119/427 |
| 6,182,609 | B1 | * | 2/2001 | Sparkman | 119/427 |

* cited by examiner

Primary Examiner—Charles T. Jordan
Assistant Examiner—Elizabeth Shaw
(74) Attorney, Agent, or Firm—Woodbridge & Associates PC; Richard C. Woodbridge, Esq.

(57) ABSTRACT

Disclosed herein is a bird launcher with a remote controlled system. The bird launcher includes a box open on its top. First and second support bars are extended widthwise from the upper corners of the sidewalls of the box. A pair of cradle rods are each rotatably inserted at both ends into two holes formed in one-side ends of the support bars. A net-shaped fabric is attached at opposite side ends to the cradle rods. A holding lever is rotatably attached to the box by a center pin, and rotatably provided at its upper end with a roller bearing. A release lever rotatably is attached to the first support bar so as to position a bird accommodated in the fabric in the box when its bend portion is engaged with the roller bearing and a depression formed on the box. A transmitter transmits a user's command. A receiver operates a solenoid to release the release lever fixed by the roller bearing attached to the holding lever and the depression formed on the center of the upper portion of one sidewall of the box, and outputs a beep sound.

5 Claims, 7 Drawing Sheets

BIRD LAUNCHER WITH REMOTE CONTROLLED SYSTEM

BACKGROUND OF THE INVENTION

1. Field of the Invention

The present invention relates generally to a bird launcher with a remote controlled system, which is capable of launching birds while hunting dogs carry out pointing training.

2. Description of the Prior Art

In U.S. Pat. No. 5,983,551 filed on Mar. 6, 1998 and issued on Nov. 16, 1999, "remote controlled apparatus and method for training retrieving dogs" is disclosed.

The prior art remote controlled apparatus is used to train retrieving dogs by launching birds from different location in various directions and at various heights and angles. The prior art remote controlled apparatus, using launch mechanisms of the type formed with a firing chamber, firing pin means, trigger means for actuating the firing pin means for firing a blank cartridge placed in the firing chamber and a launch barrel designed for explosive release of gas from a blank cartridge for launching a retrieving dummy or bird mounted on the launch barrel, is comprised of a ground engaging frame means, a plurality of support means connected to the frame means, the support means supporting a plurality of the launch mechanisms with the launch barrels, and a plurality of trigger control means mounted to the frame means.

However, the prior art remote controlled apparatus for training retrieving dogs is problematic in that the retrieving dogs do not approach the prior art remote controlled apparatus because the noise of operation is excessively great while the prior art remote controlled apparatus is operated to launch birds.

Additionally, the fabricating costs of the apparatus are high because of the complexity of its structure, the high costs of maintenance are required to troubleshoot the apparatus, and the usage of the apparatus is difficult.

SUMMARY OF THE INVENTION

Accordingly, the present invention has been made keeping in mind the above problems occurring in the prior art, and an object of the present invention is to provide a bird launcher with a remote controlled system, which allows hunting dogs to easily approach the bird launcher without a fear.

Another object of the present invention is to provide a bird launcher with a remote controlled system, which has a simple structure, thereby reducing its fabricating costs.

A further object of the present invention is to provide a bird launcher with remote controlled system, which is capable of being easily maintained with low costs.

A still further object of the present invention is to provide a bird launcher with a remote controlled system, which is capable of being easily and conveniently utilized.

In order to accomplish the above object, the present invention provides a bird launcher with a remote controlled system, comprising: a box provided with a plurality of through holes to reduce its weight and ventilate its interior, and opened on its top; first and second support bars extended widthwise from the upper corners of the sidewalls of the box; a pair of cradle rods each rotatably inserted at both ends into two holes formed in one-side ends of the support bars; a net-shaped fabric attached at both ends to the center portions of the cradle rods so as to accommodate a bird; a holding lever rotatably attached to the outer surface of one sidewall of the box by a center pin, and rotatably provided at its upper end with a roller bearing; a release lever rotatably attached to the upper outer bracket of the first support bar so as to position a bird accommodated in the fabric in the box when its bend portion is engaged with the roller bearing attached to the holding lever and a depression formed on the center of the upper portion of one sidewall of the box; a safety pin attached to a support bracket mounted on one sidewall of the box through a wire, rope or string so as to prevent the rotation of the holding lever when the safety pin is inserted into a through hole formed on the holding lever and a through hole formed on one sidewall of the box; spring tension adjusting means for varying the unfolding speed of the cradle rods; a transmitter for transmitting a user's command; and a receiver for operating a solenoid to release the release lever fixed by the roller bearing attached to the holding lever and the depression formed on the center of the upper portion of one sidewall of the box so as to launch a bird, and outputs a beep sound so as to notify a user of a location of the box.

BRIEF DESCRIPTION OF THE DRAWINGS

The above and other objects, features and other advantages of the present invention will be more clearly understood from the following detailed description taken in conjunction with the accompanying drawings, in which:

FIGS. 4a and 4b are front views showing the operation of the spring tension adjusting means of the bird launcher, wherein FIG. 4a shows the state in which the tension of coils is adjusted to be low by spring tension adjusting means, and FIG. 4b shows the state in which the tension of coils is adjusted to be high by spring tension adjusting means;

DESCRIPTION OF THE PREFERRED EMBODIMENTS

Figure 1:
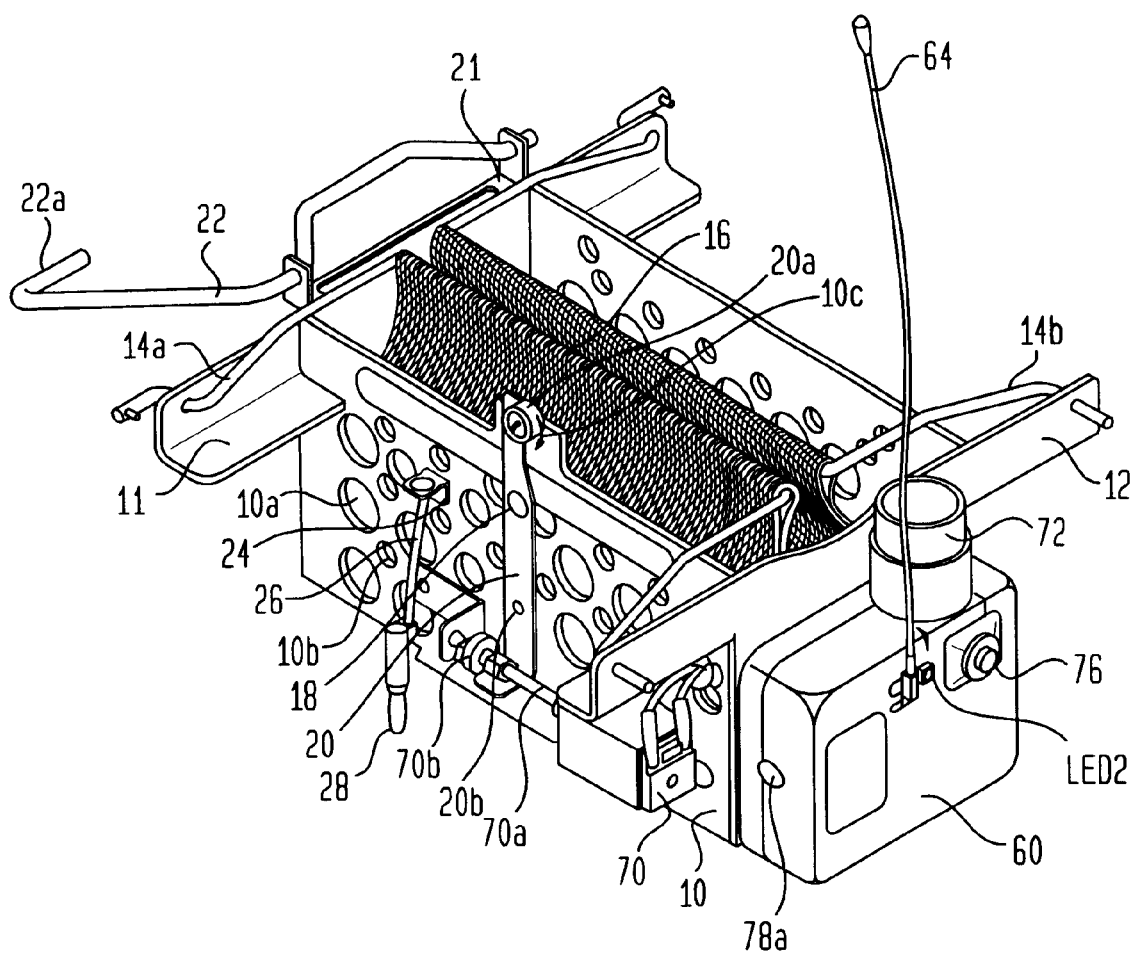
FIG. 1 is a perspective view schematically showing a bird launcher with a remote controlled system accordance with an embodiment of the present invention.
Figure 2:
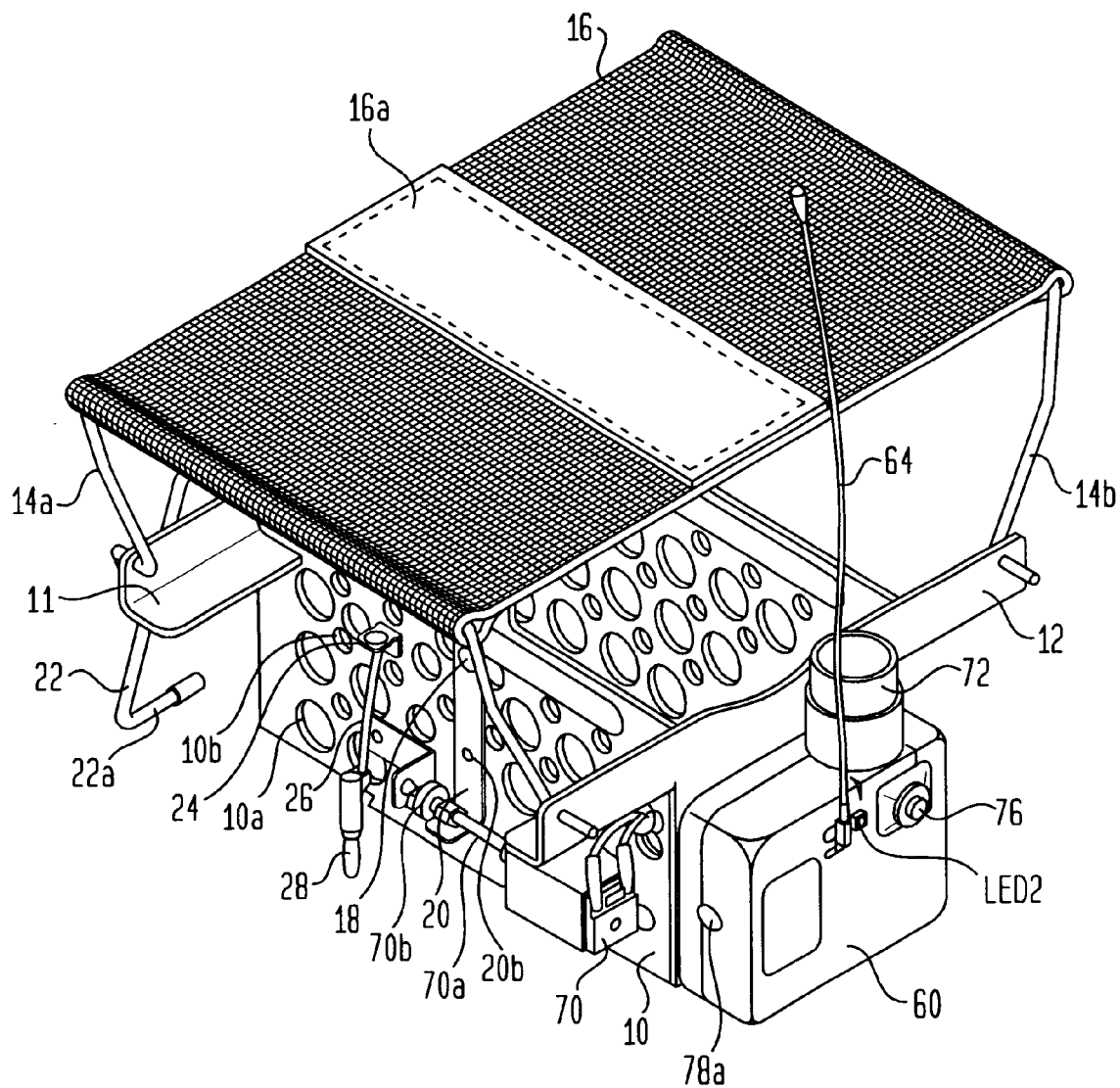
FIG. 2 is a perspective view showing the operation of the bird launcher.
Figure 3:
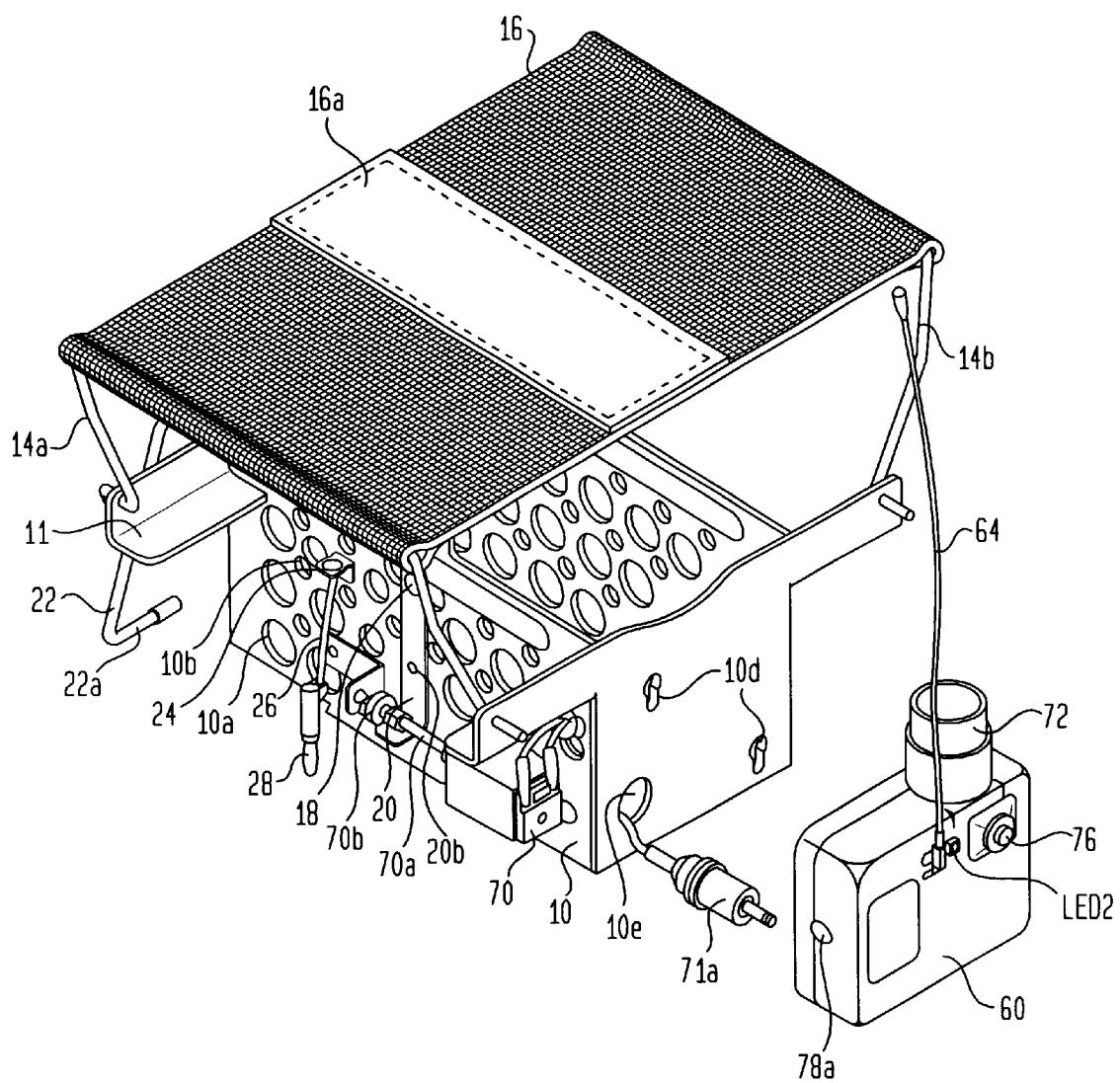
FIG. 3 is a partially exploded perspective view of the bird launcher.
Figure 4A:
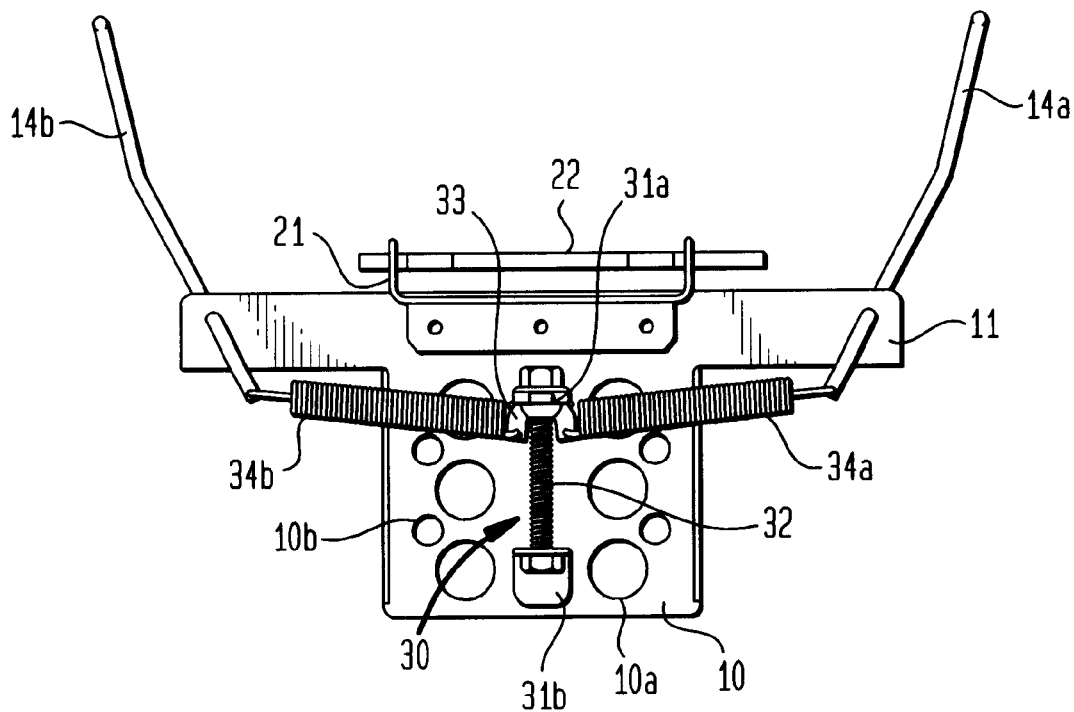
Figure 4B:
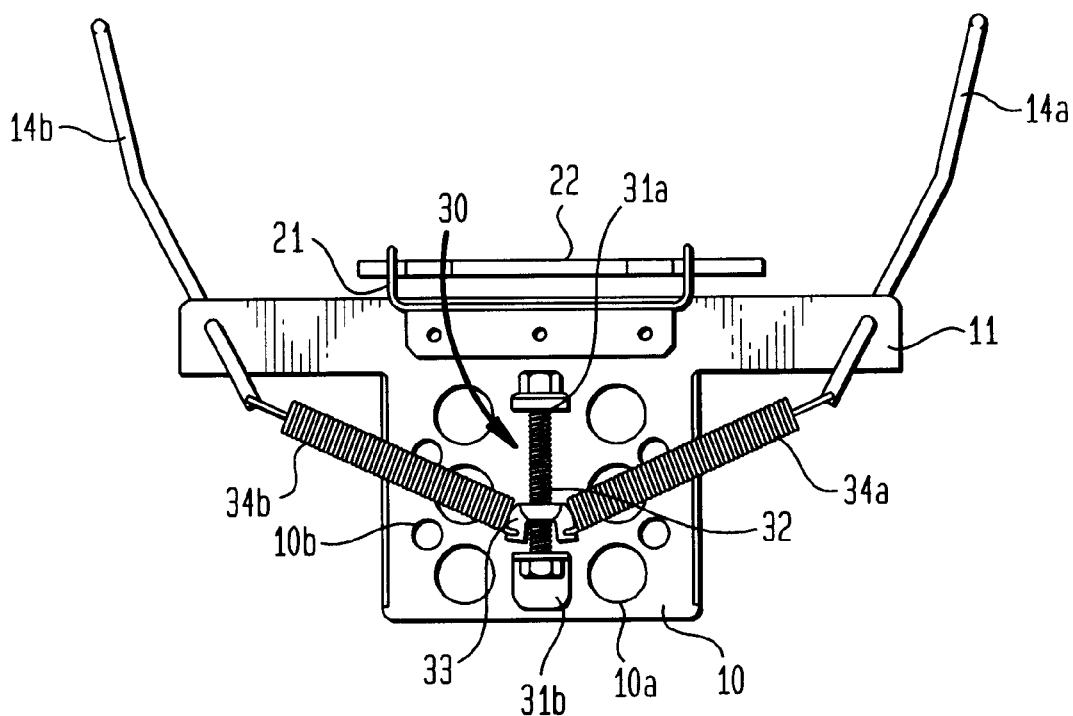
Figure 5:
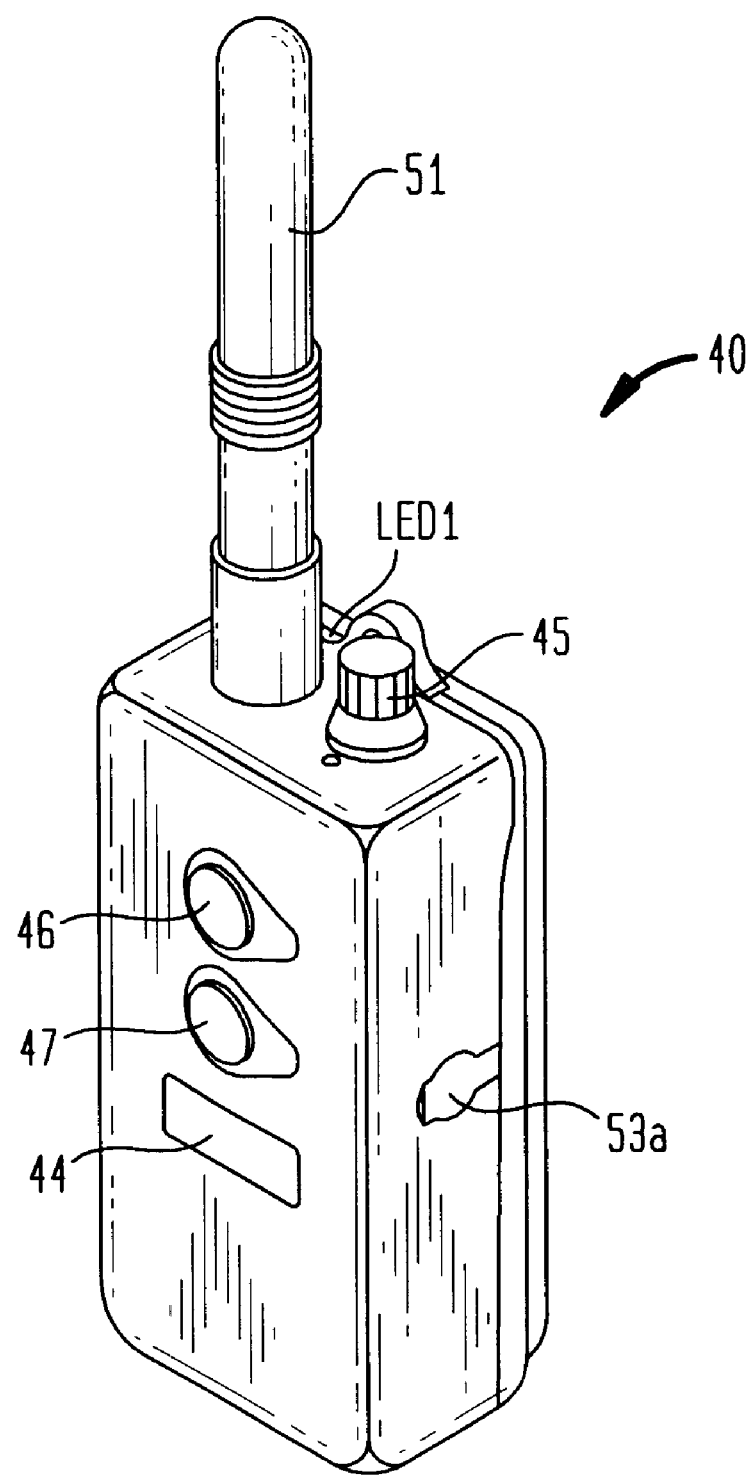
FIG. 5 is a perspective view showing the transmitter of the bird launcher.
Figure 6:
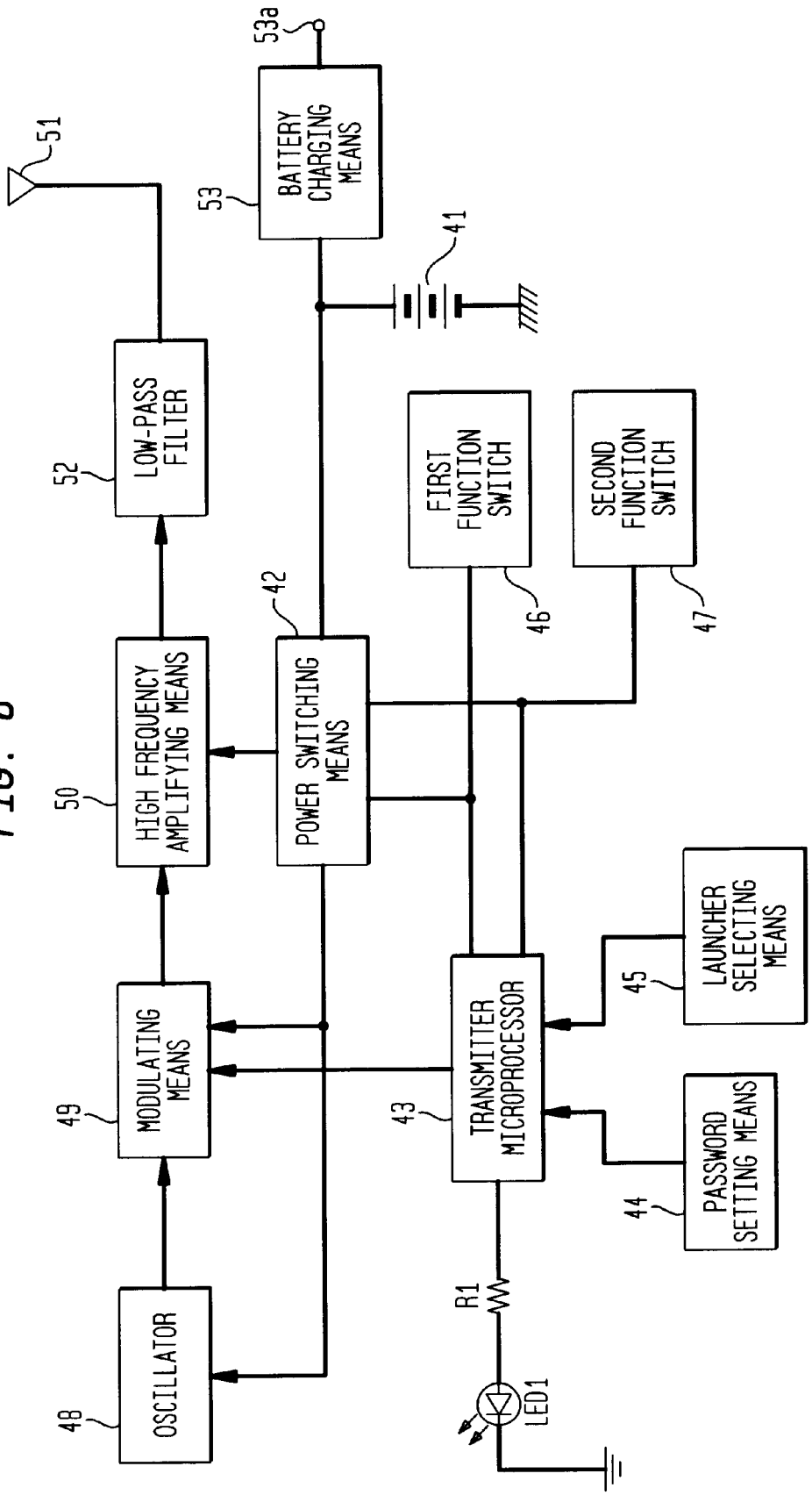
FIG. 6 is a schematic block diagram of the electric circuit of the transmitter.
Figure 7:
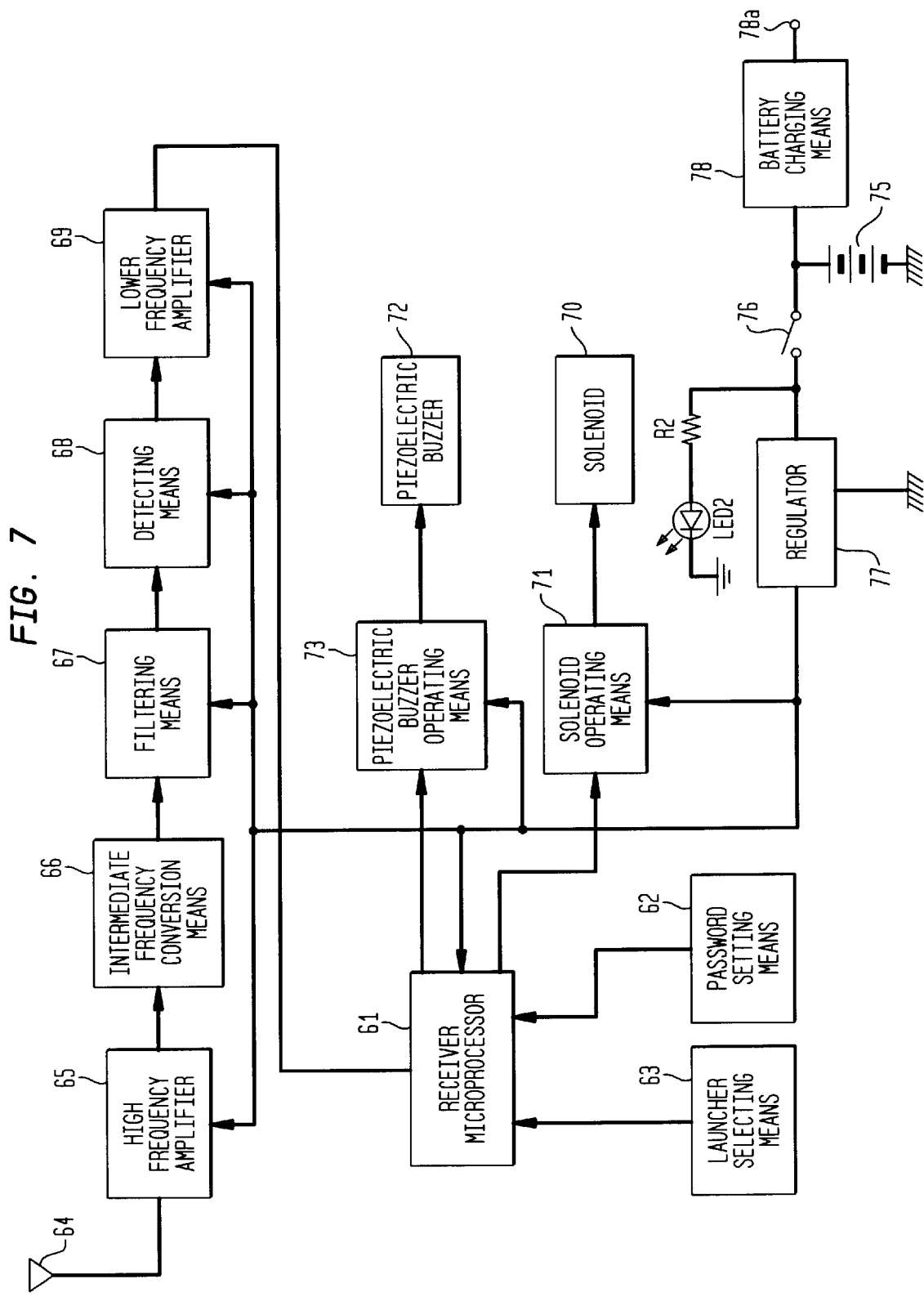
FIG. 7 is a schematic block diagram showing the electric circuit of the receiver of the bird launcher.

FIG. 1 is a perspective view schematically showing a bird launcher with a remote controlled system in accordance with an embodiment of the present invention. FIG. 2 is a perspective view showing the operation of the bird launcher. FIG. 3 is a partially exploded perspective view of the bird launcher. FIGS. 4a and 4b are front views showing the operation of the spring tension adjusting means of the bird launcher, wherein FIG. 4a shows the state in which the tension of coils is adjusted to be low by spring tension adjusting means and FIG. 4b shows the state in which the tension of coils is adjusted to be high by spring tension adjusting means. FIG. 5 is a perspective view showing the transmitter of the bird launcher. FIG. 6 is a schematic block diagram of the electric circuit of the transmitter. FIG. 7 is a schematic block diagram showing the electric circuit of the receiver of the bird launcher.

As illustrated in FIGS. 1 to 7, the bird launcher with a remote controlled system in accordance with the present invention includes a box 10, which is provided with a plurality of through holes 10a and 10b to reduce its weight and ventilate its interior, and is opened on its top. First and second support bars 11 and 12 are extended widthwise from the upper corners of the sidewalls of the box 10. A pair of cradle rods 14a and 14b are each rotatably inserted at both ends into two holes formed through one-side ends of the support bars 11 and 12. A net-shaped fabric 16 is attached at opposite side ends to the center portions of the cradle rods 14a and 14b so as to accommodate a bird. A holding lever 20 is rotatably attached to the outer surface of one sidewall of the box 10 by a center pin 18, and rotatably provided at its upper end with a roller bearing 20a. A release lever 22 is rotatably attached to the bracket 21 of the first support bar 21 so as to position a bird put on the fabric 16 in the box 10 when its bend portion 22a is engaged with the roller bearing 20a attached to the holding lever 20 and a depression 10c formed on the center of the upper portion of one sidewall of the box 10. A safety pin 28 is attached to a support bracket mounted on one sidewall of the box 10 through a wire, rope or string 26 so as to prevent the rotation of the holding lever 20 when the safety pin 28 is inserted into a through hole 20a formed on the holding lever 20 and a through hole (not shown) formed on one sidewall of the box 10. Spring tension adjusting means 30 varies the unfolding speed of the cradle rods 14a and 14b. A transmitter 40 transmits a user's command. A receiver 60 operates a solenoid 70 to release the release lever 22 fixed by the roller bearing 20a attached to the holding lever 20 and the depression 10c formed on the center of the upper portion of one sidewall of the box 10 so as to launch a bird, and outputs a beep sound so as to notify a user of the location of the box 10.

A protective patch 16a is attached to the center portion of the fabric 16 so as to prevent the fabric 16 from being damaged by the claws of a bird. The protective patch 16a may be made of artificial or natural leather.

As illustrated in detail in FIGS. 4a and 4b, the spring tension adjusting means 30 is comprised of upper and lower brackets 31a and 31b attached to the central portion of the front wall of the box 10 to be spaced apart from each other, a bolt 32 rotatably held at both ends by the upper and lower brackets 31a and 31b, a nut 33 rotatably and vertically movably fitted around the bolt 32, and a pair of coil springs 34a and 34b connected at their first ends to the nut 33 and at their second ends to the cradle rods 14a and 14b.

The transmitter 40, as shown in FIGS. 5 and 6, is comprised of a password setting means 44, a launcher selecting switch 45, a first function switch 46, a second function switch 47, a power switching means 42, an oscillator 48, modulating means 49, high frequency amplifying means 50, a low-pass filter 52, battery charging means 53, and a light emitting diode LED1.

The password setting means 44 inputs a user's password to a microprocessor 43. The launcher selecting switch 45 selects one of a plurality of bird launchers positioned at various locations. The first function switch 46 inputs a solenoid operation signal so as to launch a bird accommodated in the fabric 16. The second function switch 47 inputs a beep sound operating signal to notify a user of the location of the bird launcher. The power switching means 42 supplies power from batteries 41 while the first and second function switches 46 and 47 are operated. The oscillator 48 oscillates a clock pulse having a certain period while the power switching means 42 is switched on. The modulating means 49 receives the clock pulse oscillated by the oscillator 48 and the solenoid operation signal or beep sound operation signal outputted from the microprocessor 43, and modulates the solenoid operation signal or beep sound operation signal into a carrier wave. The high frequency amplifying means 50 receives the carrier wave generated by the modulating means 49 and amplifies the carrier wave to a radio frequency. The low-pass filter 52 intercepts a high-level frequency signal contained in the radio frequency generated by the high frequency amplifying means 50 and outputs the remaining signal to a transmitter antenna 51. The battery charging means 53 receives alternating current from a battery charging terminal 53a, rectifies it and charges the batteries 41 with direct current. The light emitting diode LED1 indicates the transmission of a signal from the transmitter antenna 51. In FIG. 6, R1 denotes a current limit resistance for restricting the amount of current applied to the light emitting diode LED1.

The receiver 60, as shown in FIGS. 1 and 7, is comprised of a password setting means 62, a launcher selecting switch 63, a receiver antenna 64, high frequency amplifying means 65, intermediate frequency conversion means 66, filtering means 67, detecting means 68, a low frequency amplifier 69, solenoid operating means 71, and piezoelectric buzzer operating means 73.

The password setting means 62 inputs a user's password to a receiver microprocessor 61. The launcher selecting switch 63 inputs the order of the bird launcher to the receiver microprocessor 61. The receiver antenna 64 receives the signal transmitted from the transmitter antenna 51 of the transmitter 40. The high frequency amplifying means 65 receives and high frequency amplifies the signal received by the receiver antenna 64. The intermediate frequency conversion means 66 converts the frequency of the signal high frequency amplified by the high frequency amplifying means 65 to an intermediate frequency. The filtering means 67 filters a noise contained in the signal of the intermediate frequency. The detecting means 68 detects the signal filtered by the filtering means 67. The low frequency amplifier 69 receives the signal detected by the detecting means 68, low frequency amplifies it and outputs it to the receiver microprocessor 61. The solenoid operating means 71 receives the control signal for operating the solenoid 70 outputted from the detecting means 68 and operates the solenoid 70 to launch a bird accommodated in the fabric 16 when the receiver microprocessor 61 receives the signal low frequency amplified by the low frequency amplifier 69, the password set on the transmitter microprocessor 43 coincides with the password memorized on the receiver microprocessor 61 by the password setting means 62, and the low frequency amplified signal is the signal inputted by the first function switch 46 of the transmitter 40 for operating the solenoid 70. The piezoelectric buzzer operating means 73 receives a control signal outputted from the receiver microprocessor 61 and outputs a beep sound for notifying a user of the location of the bird launcher when the receiver microprocessor 61 receives the signal low frequency amplified by the low frequency amplifier 69, the password set on the transmitter microprocessor 43 coincides with a password memorized on the receiver microprocessor 61 by the password setting means 62, and the low frequency amplified signal is the signal inputted by the second function switch 47 of the transmitter 40 for operating the piezoelectric buzzer 72.

The receiver 60 is further comprised of a main switch 76, a regulator 77 for receiving power from the batter supplying constant voltage to the solenoid operating circuit 71, the piezo-electric buzzer operating circuit 73, the receiver microprocessor 61, the high frequency amplifier 65, the intermediate frequency conversion means 66, the filtering means 67, the detection means 68 and the low frequency amplifier 69, a light emitting diode LED1 for indicating the power output of the batteries 75 to the regulator 77, and battery charging means 78 for receiving alternating current through a charging terminal 78a, rectifying the alternating current to direct current and charging the batteries with the direct current. In FIG. 7, R2 denotes a current limit resistance the amount of current applied to the light emitting diode LED2.

In FIG. 3, reference numeral 10d denotes through holes for allowing the receiver 60 to be secured to the box 10 by means of a screw (not shown), and reference numeral 10e denotes a through hole for allowing a plug 71a, which electrically connects the receiver microprocessor 61 of the receiver 60 to the solenoid operating means 71, to pass through the wall of the box 10.

Hereinafter, the operation and effects of the bird launcher according to an embodiment of the present invention are described.

A user's password is memorized on the microprocessor 43 by the password setting means 44. The order of a plurality of bird launchers situated at various locations is set on the microprocessor 43 by the launcher selecting switch 45 of the transmitter 40. The user's password is inputted to the receiver microprocessor 61 by the password selecting means 62 of the receiver 60. The order of the bird launcher set by the launcher selecting switch 45 of the transmitter 40 is inputted to the receiver microprocessor 61 to coincide with the order of the bird launcher memorized by the launcher selecting switch 63 of the receiver 60 (although the passwords of the transmitter 40 and the receiver 60 are generally and respectively inputted to and memorized in the transmitter microprocessor 43 and the receiver microprocessor 61, they may be changed in accordance with the user's need).

After the passwords and the orders of the bird launcher are set as described above, a bird is put on the fabric 16 and the cradle rods 14a and 14b are folded into the interior of the box 10. When the release lever 22 is rotated around the bracket 21 in a clockwise direction and the bent portion 22a is inserted into the depression 10c formed in the center of the upper portion of one sidewall of the box 10, the release lever 22 is fixed by the roller bearing 20a attached to the holding lever 20, thereby securing the cradle rods 14a and 14b in the box 10.

After the bird is put on the fabric 16 and the cradle rods 14a and 14b are folded into the box 10 and secured in the box 10 by the release lever 22, the bird launchers are dispersed at various locations.

Thereafter, when one of the first and second function switches 46 and 47 of the transmitter 40 is switched on, the power switching means 42 and the power switch 76 of the receiver 60 are switched on. When a user selects one (for example, a first bird launcher) of the bird launchers by the launcher selecting switch 45 according to the order of the bird launchers memorized by the launcher selecting switch 63 of the receiver 60 and switches on the first function switch 46 of the transmitter 40 so as to launch a bird accommodated in the fabric 16 of the first bird launcher, the signals concerning these manipulations is inputted to the transmitter microprocessor 43.

The microprocessor 43 calculates the signals and outputs the signal for operating the solenoid 70 of the first bird launcher to the modulation means 49. The modulation means 49 receives the signal for operating the solenoid 70 and a clock pulse from the oscillator 48, modulates the signal for operating the solenoid 70 to a carrier wave, and outputs the carrier wave to the high frequency means 50.

The high frequency amplifying means 50 receives the signal for operating the solenoid 70 modulated into the carrier wave, high frequency amplifies this signal for operating the solenoid 70, and outputs this high frequency amplified signal to the low-pass filter 52. The low-pass filter 52 intercepts a high-level frequency signal included in a radio signal amplified to the high frequency radio frequency and transmits the remaining signal through the transmitter antenna 51.

In this case, current flows from the microprocessor 43 through the current limit resistance R1 to the light emitting diode LED1, so the transmission of the signal from the transmitter antenna 51 is indicated by the light emitting diode LED1. The power switching means 42 is switched on by the operation of the first function switch 46, so current flows from the batteries 41 to the microprocessor 43, the oscillator 48, the modulating means 49 and the high frequency amplifying means 50.

The receiver antenna 64 of the receiver 60 receives the signal transmitted from the transmitter antenna 51. The high frequency amplifier 65 high frequency amplifies the received signal and outputs the received signal to the intermediate frequency conversion means 66. The intermediate frequency conversion means 66 receives the signal high frequency amplified by the high frequency amplifier 65, coverts the frequency of the received signal to an intermediate frequency, and outputs the signal of the intermediate frequency to the filtering means 67.

The filtering means 67 filters a noise included in the signal converted into the signal of the intermediate frequency and outputs the noise-free signal to the detecting means 68. The detecting means 68 receives the noise-free signal, detects this signal and outputs this signal to the low frequency amplifier 69. The low frequency amplifier 69 receives the detected signal, low frequency amplifies the detected signal and outputs the low frequency amplified, detected signal to the receiver microprocessor 61.

When the password set on the transmitter microprocessor 43 coincides with the password memorized on the receiver microprocessor 61 by the password setting means 62, the signal low frequency amplified by the low frequency amplifier 69 is the signal inputted by the second function switch 47 of the transmitter 40 for operating the solenoid 70, the bird launcher concerning the low frequency amplified signal is the bird launcher set by the launcher setting switch 63, the receiver microprocessor 61 outputs the control signal for operating the solenoid 70 to the solenoid operating means 71 and operates the solenoid 70. Accordingly, the operating rod 70a of the solenoid 70 is pulled to the right from the location shown in FIG. 1, so the disc 70b of the operating rod 70a pushes the lower end of the holding lever 20, thereby rotating the upper end of the holding lever 20 in a counterclockwise direction.

As a result, the roller bearing 20a attached to the upper end of the holding lever 20 is rotated in a counterclockwise direction, and the bent portion 22a of the release lever 22 is rotated around the bracket 21 in a counterclockwise direction. The cradle rod 14a is rotated around the first and second support bars 11 and 12 in a counterclockwise direction by the compression of the coil springs 34a and 34b of the spring tension adjusting means 30, the cradle rod 14b is rotated around the first and second support bars 11 and 12 in a clockwise direction by the compression of the coil springs 34a and 34b of the spring tension adjusting means 30, thereby launching a bird to the air. At this time, a hunting dog is near the bird launcher, so the bird is surprised and flies high and far to the air.

Hereinafter, the function of outputting a beep sound to notify a user of the location of the launcher after the bird is made to fly to the air is described.

When the second function switch 47 is pushed, a signal concerning this manipulation is inputted to the microprocessor 43, and at the same time the power switching means 42 is switched on. The microprocessor 43 calculates this signal and outputs a signal for outputting a beep sound to the modulating means 49. The modulating means 49 receives the signal for outputting a beep sound and a clock pulse oscillated by the oscillator 48, modulates this signal for outputting a beep sound into a carrier wave, and outputs the carrier wave to the high frequency amplifying means 50.

The high frequency amplifying means 50 receives the signal for outputting the beep sound modulated into the carrier wave, high frequency amplifies this signal, and outputs this high frequency amplified signal to the low-pass filter 52. The low-pass filter 52 intercepts a high-level frequency signal included in the radio signal amplified to a high frequency radio frequency and transmits the filtered signal through the transmitter antenna 51.

In this case, current flows from the microprocessor 43 through the current limit resistance R1 to the light emitting diode LED1, so the transmission of the signal from the transmitter antenna 51 is indicated by the light emitting diode LED1. The second function switch 47 is operated and the power switching means 42 is switched on, so current flows from the batteries 41 to the microprocessor 43, the oscillator 48, the modulating means 49 and the high frequency amplifying means 50.

The receiver antenna 64 of the receiver 60 receives the signal transmitted from the transmitter antenna 51. The high frequency amplifier 65 high frequency amplifies the received signal and outputs the high frequency amplified, received signal to the intermediate frequency conversion means 66. The intermediate frequency conversion means 66 receives the signal high frequency amplified by the high frequency amplifier 65, coverts the frequency of this high frequency amplified, received signal to an intermediate frequency, and outputs the signal of this intermediate frequency to the filtering means 67.

The filtering means 67 filters a noise included in the signal converted into the signal of the intermediate frequency, and outputs the noise-free signal to the detecting means 68. The detecting means 68 receives this noise-free signal, detects this noise-free signal, and outputs this detected noise-free signal to the low frequency amplifier 69. The low frequency amplifier 69 receives the detected signal, low frequency amplifies this detected signal and outputs this low frequency amplified signal to the receiver microprocessor 61.

The receiver microprocessor 61 receives the signal low frequency amplified by the low frequency amplifier 69, and outputs a control signal for operating the piezoelectric buzzer 72 to the piezoelectric buzzer operating means 73 when the password set on the transmitter microprocessor 43 coincides with the password memorized on the receiver microprocessor 61 by the password setting means 62, the signal low frequency amplified by the low frequency amplifier 69 is the signal inputted by the second function switch 47 of the transmitter 40 for operating the piezoelectric buzzer 72, and the bird launcher concerning the low frequency amplified signal coincides with the bird launcher set by the launcher selecting switch 63. As a result, the piezoelectric buzzer 72 outputs a beep sound, so a user can be notified of the location of the bird launcher and can collect it easily.

In such a case, when the cradle rods 14a and 14b are desired to be rapidly rotated around the first and second support bars 14a and 14b, the bolt 32 is rotated in a clockwise direction from the location shown in FIG. 4, so the nut 33 is downwardly moved and the tension of the coil springs 34a and 34b is increased, thereby allowing the cradle rods 14a and 14b to be rapidly rotated around the first and second support rods 14a and 14b. In contrast, when the cradle rods 14a and 14b are desired to be slowly rotated around the first and second support bars 14a and 14b, the bolt 32 is rotated in a counterclockwise direction from the location shown in FIG. 4, so the nut 33 is upwardly moved and the tension of the coil springs 34a and 34b is reduced, thereby allowing the cradle rods 14a and 14b to be slowly rotated around the first and second support rods 14a and 14b.

In the meantime, while the power switch 76 is switched on, the light emitting diode LED2 indicates the supply of current to the batteries 75.

When the bird launcher of the present invention is not in use, the safety pin 28 is inserted into the through hole formed in the holding lever 20 and the through hole formed in the box 10, the movement of the holding lever 20 and the release lever 22 is restricted, thereby preventing the cradle rods 14a and 14b from being rotated.

When the batteries 41 of the transmitter 40 are desired to be charged with current, the battery charging terminal 53a is electrically connected to an AC power outlet (not shown), thereby charging the batteries 41 with DC current. When the batteries 75 of the receiver 60 are desired to be charged with current, the battery charging terminal 78a is electrically connected to an AC power outlet, thereby charging the batteries 75 with DC current.

In the above description, although the processing of password data inputted by the password setting means 44, launcher selection signal data inputted by the launcher selecting switch 45, solenoid operating signal data inputted by the first function selecting switch 46, and beep sound output control signal data inputted by the second function switch 47 by the microprocessor 43 of the transmitter 40 are described as examples, the functions of the bird launcher of the present invention are not limited to this. For example, the case where the signal data are processed by an encoder belongs to the scope of the present invention.

In addition, although the calculation of password data inputted by the password setting means 62, launcher selection signal data inputted by the launcher selecting switch 63 and signal data inputted by the low frequency amplifier 69 are described as examples, the functions of the bird launcher of the present invention are not limited to this. For example, the case where these signal data are decoded by a decoder instead of the receiver microprocessor belongs to the scope of the present invention.

As described above, the present invention provides a bird launcher with a remote controlled system, in which when the receiver of the bird launcher receivers a signal and two passwords coincide with each other, the solenoid is operated to release the release lever fixed by the roller bearing attached to the holding lever and the depression formed on the center of the upper portion of one sidewall of the box, a beep sound is outputted to notify a user of the location of the box, and the unfolding speed of the cradle rods (that is, the tension of the coil springs) is adjusted by the spring tension adjusting means. Accordingly, the bird launcher of the present invention is advantageous in that hunting dogs are not surprised and easily approaches the bird launcher because of the small sound of operation of the bird launcher, the structure of the bird launcher is simplified, the trouble shooting of the bird launcher can be easily performed at a low cost, the usage of the bird launcher is easy, and the fabricating costs of the bird launcher can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bird launcher with a remote controlled system, comprising:

a box provided with a plurality of through holes to reduce its weight and ventilate its interior, and opened on its top;

first and second support bars extended widthwise from upper corners of sidewalls of the box;

a pair of cradle rods each rotatably inserted at both ends into two holes formed in one-side ends of said support bars;

a net-shaped fabric attached at opposite side ends to center portions of the cradle rods so as to accommodate a bird;

a holding lever rotatably attached to an outer surface of one sidewall of the box by a center pin, and rotatably provided at its upper end with a roller bearing;

a release lever rotatably attached to an upper outer bracket of the first support bar so as to position a bird accommodated in the fabric in the box when its bend portion is engaged with the roller bearing attached to the holding lever and a depression formed on a center of an upper portion of one sidewall of the box;

a safety pin attached to a support bracket mounted on one sidewall of the box through a wire, rope or string so as to prevent rotation of the holding lever when the safety pin is inserted into a through hole formed on the holding lever and a through hole formed on one sidewall of the box;

spring tension adjusting means for varying unfolding speed of the cradle rods;

a transmitter for transmitting a user's command; and a receiver for operating a solenoid to release the release lever fixed by the roller bearing attached to the holding lever and the depression formed on the center of an upper portion of one sidewall of the box so as to launch a bird, and outputs a beep sound so as to notify a user of a location of the box.

2. The bird launcher according to claim 1, wherein said transmitter is comprised of:

a password setting means for inputting a user's password to a microprocessor;

a launcher selecting switch for selecting one of a plurality of bird launchers positioned at various locations;

a first function switch for inputting a solenoid operation signal so as to launch a bird accommodated in the fabric;

a second function switch for inputting a beep sound operating signal to notify a user of the location of the bird launcher;

a power switching means for supplying power from batteries while the first and second function switches are operated;

an oscillator for oscillating a clock pulse having a certain period while the power switching means is switched on;

modulating means for receiving the clock pulse oscillated by the oscillator and the solenoid operation signal or beep sound operation signal outputted from the microprocessor, and modulating the solenoid operation signal or beep sound operation signal into a carrier wave;

high frequency amplifying means for receiving the carrier wave generated by the modulating means and amplifying the carrier wave to a radio frequency;

a low-pass filter for intercepting a high-level frequency signal contained in the radio frequency generated by the high frequency amplifying means and outputting the remaining signal to a transmitter antenna;

battery charging means for receiving alternating current from a battery charging terminal, rectifying them and charging the batteries with direct current; and a light emitting diode indicates transmission of a signal from the transmitter antenna.

3. The bird launcher according to claim 1, wherein said receiver is comprised of:

a password setting means for inputting a user's password to a receiver microprocessor;

a launcher selecting switch for inputting the order of the bird launcher to the receiver microprocessor;

a receiver antenna for receiving the signal transmitted from the transmitter antenna of the transmitter;

a high frequency amplifying means for receiving and high frequency amplifying the signal having been received by the receiver antenna;

intermediate frequency conversion means for converting the frequency of the signal high frequency amplified by the high frequency amplifying means to an intermediate frequency;

filtering means for filtering a noise contained in the signal of the intermediate frequency;

detecting means for detecting the signal filtered by the filtering means;

a low frequency amplifier for receiving the signal detected by the detecting means, low frequency amplifying it and outputting it to the receiver microprocessor;

solenoid operating means for receiving the control signal for operating a solenoid outputted from the detecting means and operating the solenoid to launch a bird accommodated in the fabric when the solenoid operating means receives the signal low frequency amplified by the low frequency amplifier from the receiver microprocessor, the password set on the transmitter microprocessor coincides with the password memorized in advance on the receiver microprocessor by the password setting means, and the low frequency amplified signal is the signal inputted by the first function switch of the receiver for operating the solenoid; and piezoelectric buzzer operating means for receiving a control signal outputted from the receiver microprocessor and outputting a beep sound for notifying a user of the location of the bird launcher when the piezoelectric buzzer operating means receives the signal low frequency amplified by the low frequency amplifier from the receiver microprocessor, the password set on the transmitter microprocessor coincides with a password memorized in advance on the receiver microprocessor by the password setting means, and the low frequency amplified signal is the signal inputted by the second function switch of the receiver for operating the piezoelectric buzzer.

4. The bird launcher according to claim 1, further comprising a protective patch, said protective patch being attached to the center portion of said fabric so as to prevent said fabric from being damaged by claws of a bird.

5. The bird launcher according to claim 1, wherein said spring tension adjusting means is comprised of:

upper and lower brackets attached to a central portion of a front wall of said box to be spaced apart from each other;

a bolt rotatably held at both ends by said upper and lower brackets;

a nut rotatably and vertically movably fitted around said bolt; and a pair of coil springs connected at their first ends to said nut and at their second ends to said cradle rods.

* * * * *